US012616936B2

(12) United States Patent (10) Patent No.: US 12,616,936 B2
Sasaki et al. (45) Date of Patent: May 5, 2026

(54) LITHIUM ISOTOPE CONCENTRATION DEVICE, MULTI-STAGE LITHIUM ISOTOPE CONCENTRATION DEVICE, AND LITHIUM ISOTOPE CONCENTRATION METHOD

(71) Applicant: Hirosaki University, Aomori (JP)

(72) Inventors: Kazuya Sasaki, Aomori (JP); Kiyoto Shinmura, Aomori (JP)

(73) Assignee: HIROSAKI UNIVERSITY, Aomori (JP)

( * ) Notice: Subject to any disclaimer, the term of this patent is extended or adjusted under 35 U.S.C. 154(b) by 592 days.

(21) Appl. No.: 18/003,701

(22) PCT Filed: Jul. 6, 2021

(86) PCT No.: PCT/JP2021/025527
§ 371 (c)(1),
(2) Date: Dec. 29, 2022

(87) PCT Pub. No.: WO2022/009905
PCT Pub. Date: Jan. 13, 2022

(65) Prior Publication Data
US 2023/0256390 A1 Aug. 17, 2023

(30) Foreign Application Priority Data
Jul. 7, 2020 (JP) ................................. 2020-117141

(51) Int. Cl.
B01D 59/42 (2006.01)
B01D 59/12 (2006.01)
*B01D 59/14* (2006.01)

(52) U.S. Cl.
CPC ............. B01D 59/42 (2013.01); B01D 59/12 (2013.01); *B01D 59/14* (2013.01); *B01D 2313/22* (2013.01)

(58) Field of Classification Search
None
See application file for complete search history.

(56) References Cited

FOREIGN PATENT DOCUMENTS

| | | |
|---|---|---|
| JP | S5324998 A | 3/1978 |
| JP | 2007325983 A | 12/2007 |
| JP | 5429658 B2 | 2/2014 |
| JP | 2016528223 A | 9/2016 |

(Continued)

OTHER PUBLICATIONS

Kobayashi et al, Numerical investigation for lithium isotope effect in ionic superconductor, Fusion Engineering and Design, vol. 136, Part A., Nov. 2018, pp. 205-209 (Year: 2018).*

(Continued)

*Primary Examiner* — Harry D Wilkins, III
(74) *Attorney, Agent, or Firm* — GRUMBLES LAW PLLC; Brittany Haanan

(57) ABSTRACT
A lithium isotope concentration device includes a treatment tank partitioned in a supply tank and a recovery tank by an electrolyte membrane having a lithium-ion conductivity. The electrolyte membrane is cooled by a cooling device via an Li-containing aqueous solution in the supply tank to have a low temperature at which the Li isotope separation coefficient is larger. A power supply device, connected between electrodes provided on opposite surfaces of the electrolyte membrane, applies a positive voltage to an electrode on a supply tank side.

7 Claims, 7 Drawing Sheets

(56) References Cited

FOREIGN PATENT DOCUMENTS

JP          2019141807 A          8/2019
JP          2019141808 A          8/2019

OTHER PUBLICATIONS

Shun-mura et al, Effect of Applied Voltage on Isotope Separation Factor By Electrodialysis Using Lithium Ion Conductive Electrolyte La0.57Li0.29TiO3, ECS Meeting Abstracts MA2020-02, Oct. 2020, # 3578 (Year: 2020).*

Honda et al., "Lithium isotope enrichment by electrochemical pumping using solid lithium electrolytes", Journal of the Ceramic Society of Japan, 2018, vol. 126, Issue 5, pp. 331-335.

International Search Report and Written Opinion pertaining to PCT/JP2021/025527, mailed Sep. 7, 2021.

Kunugi et al., "Investigation of Isotope Effect of Lithium Ion Conductivity in ( La , Li ) TiO3 Single Crystal", The Electrochemical Society, Electrochemical and Solid-State Letters, 2002, 5 A131.

Morita et al., "Ab initio molecular dynamics study of isotope effects in lithium-ion conductors", Solid State Ionics, 2020, 355, 115434.

Nie et al., "Ion-fractionation of lithium ions from magnesium ions by electrodialysis using monovalent selective ion-exchange membranes", Desalination, 2017, 403, 128-135.

Okada et al., "High Enrichment of LiEA by Countercurrent Electromigration in Molten LiNO3 with Molten NH4NO3 at the Cathode", Tokyo Institute of Technology, Department of Electronic Chemistry, 1986.

Search Report pertaining to corresponding European Patent Application No. 21838411.3, dated Jul. 30, 2024.

Shin-Mura et al., "Temperature effect on lithium isotope separation by electrodialysis using La0.57Li0.29TiO3 electrolyte", Fusion Engineering and Design, 2021, 171, 112577.

Zhao et al., "Sandwiched liquid-membrane electrodialysis: Lithium selective recovery from salt lake brines with high Mg/Li ratio", Journal of Membrane Science, 2020, 596, 117685.

* cited by examiner

FIG. 7

LITHIUM ISOTOPE CONCENTRATION DEVICE, MULTI-STAGE LITHIUM ISOTOPE CONCENTRATION DEVICE, AND LITHIUM ISOTOPE CONCENTRATION METHOD

TECHNICAL FIELD

The present invention relates to a lithium isotope concentration device, a multi-stage lithium isotope concentration device, and a lithium isotope concentration method for separating a lithium isotope.

BACKGROUND ART

Lithium (Li) has two stable isotopes, $^7Li$ and $^6Li$, and the natural abundances of these are 92.41 mol % and 7.59 mol %. The properties of $^7Li$ having a mass number of 7 and $^6Li$ having a mass number of 6 are largely different, and for example, $^7Li$ is used for adjustment of pH (concentration of hydrogen ions) of coolants of nuclear reactors. On the other hand, $^6Li$ is used for production of tritiated hydrogen (tritium), which is a fuel of fusion reactors. For this reason, techniques for concentrating or separating one of $^7Li$ and $^6Li$ into a state where the content of the other is lower have been developed. The amalgam method, the molten salt method, and the distillation method as well as the adsorption method and the electrodialysis method (for example, Patent Literature 1), which are also methods for selectively recovering lithium ions $Li^+$ from seawater, are known.

In comparison with the amalgam method, which uses a large amount of mercury, and the molten salt method and the distillation method, which heat lithium compounds and the like at high temperatures, the adsorption method and the electrodialysis method are relatively excellent from the viewpoints of environmental loads and the like. Meanwhile, these methods utilize the fact that a large amount of $^6Li^+$, which has a smaller mass and thus has a higher moving speed, is recovered. Meanwhile, these methods have small isotope separation coefficients, and thus have low productivity as concentration methods. In view of this, regarding the concentration of lithium isotopes by the electrodialysis method, the present inventors found that the isotope separation coefficient is large only for a short period of time immediately after the start of operation, and invented a method for enhancing the efficiency by intermittently applying a voltage (Patent Literature 2, Non-Patent Literature 1).

CITATION LIST

Patent Literature

Patent Literature 1: JP5429658
Patent Literature 2: JP2019-141808

Non-Patent Literature

Non-Patent Literature 1: Shunsuke Honda, Kiyoto Shinmura, Kazuya Sasaki, "Lithium isotope enrichment by electrochemical pumping using solid lithium electrolytes", Journal of the Ceramic Society of Japan, Volume 126, Issue 5, pp 331-335, May 2018

SUMMARY OF INVENTION

Technical Problem

The methods described in Patent Literature 2 and the like still have room for further improvement in order to increase the isotope separation coefficient.

The present invention has been made in view of the above-described problems, and an object thereof is to provide a lithium isotope concentration device, a multi-stage lithium isotope concentration device, and a lithium isotope concentration method which are safe and have high efficiency.

Solution to Problem

As a result of earnestly studying the concentration of lithium isotopes by the electrodialysis method, the present inventors found that $^7Li^+$ and $^6Li^+$ have different degrees of temperature dependency and voltage dependency of mobility, and conceived of setting the temperature and the applied voltage within appropriate ranges.

Specifically, a lithium isotope concentration device according to the present invention includes a treatment tank partitioned into a first tank and a second tank and recovers, from an aqueous solution being held in the first tank and containing $^6Li$ and $^7Li$ in a state of lithium ions, a lithium ion-containing aqueous solution having a higher isotope ratio of $^6Li$ than that of the aqueous solution into the second tank. The device includes: a lithium-ion conductivity electrolyte membrane partitioning the treatment tank; electrodes having porous structures, the electrodes being provided in contact respectively with opposite surfaces of the lithium-ion conductivity electrolyte membrane; a power supply device configured to apply a voltage between the electrodes; and a cooling device configured to cool the lithium-ion conductivity electrolyte membrane. In addition, a multi-stage lithium isotope concentration device according to the present invention includes: two or more of the lithium isotope concentration devices which are coupled such that the treatment tanks are integrated. The lithium-ion conductivity electrolyte membranes of the respective lithium isotope concentration devices are arranged away from each other in such a manner as to partition the integrated treatment tanks into three tanks or more. The second tank of one of neighboring two of the lithium isotope concentration devices also serves as the first tank of the other. The cooling device cools the aqueous solution held in at least one tank of the partitioned treatment tanks.

With such configurations, lithium ions move in the lithium-ion conductivity electrolyte membrane at a low temperature at which the difference in mobility between $^6Li^+$ and $^7Li^+$ is large, and a larger amount of $^6Li$ moves and is recovered.

A lithium isotope concentration method according to the present invention is a method for in a treatment tank partitioned into a first tank and a second tank by a lithium-ion conductivity electrolyte membrane, recovering, from an aqueous solution being held in the first tank and containing $^6Li$ and $^7Li$ in a state of lithium ions, a lithium ion-containing aqueous solution having a higher isotope ratio of $^6Li$ than that of the aqueous solution into the second tank. Then, the lithium isotope concentration method according to the present invention includes: applying a voltage between electrodes having porous structures, the electrodes being provided in contact respectively with opposite surfaces of the lithium-ion conductivity electrolyte membrane, with an electrode on a first tank side being set as positive while cooling the lithium-ion conductivity electrolyte membrane to 20° C. or lower. Alternatively, the lithium isotope concentration method of the present invention includes: applying a voltage of 1.5 V or lower between electrodes having porous structures, which are provided in contact respectively with opposite surfaces of the lithium-ion conductivity electrolyte membrane, with an electrode on a first tank side being set as positive.

Such methods make it possible to cause lithium ions to move in the lithium-ion conductivity electrolyte membrane under conditions under which the difference in mobility between $^6Li^+$ and $^7Li^+$ is large, to thus move and recover a larger amount of $^6Li^+$.

Advantageous Effects of Invention

The lithium isotope concentration device and lithium isotope concentration methods according to the present invention make it possible to efficiently and safely recover an aqueous solution having a higher isotope ratio of $^6Li$. Furthermore, the multi-stage lithium isotope concentration device according to the present invention makes it possible to further increase the isotope ratio of $^6Li$.

BRIEF DESCRIPTION OF DRAWINGS

FIG. 7 is a schematic diagram for explaining a configuration of a multi-stage lithium isotope concentration device according to an embodiment of the present invention.

DESCRIPTION OF EMBODIMENTS

Figures 1, 2:
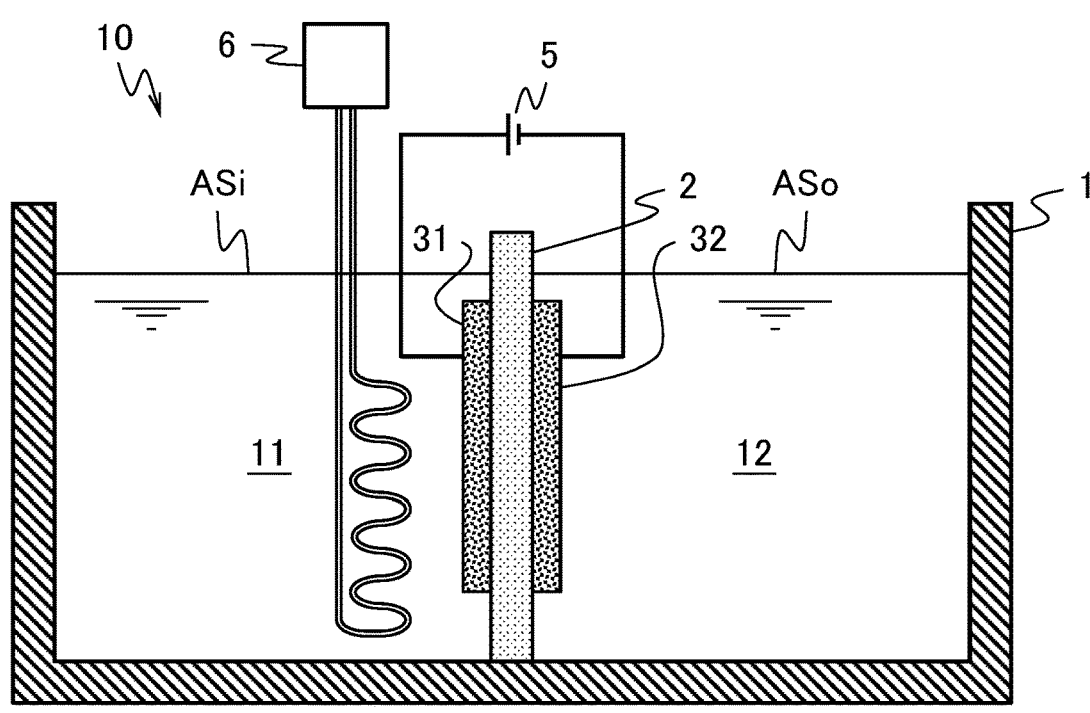
FIG. 1 is a schematic diagram for explaining a configuration of a lithium isotope concentration device according to an embodiment of the present invention.
FIG. 2 is a schematic diagram of the lithium isotope concentration device shown in FIG. 1 for explaining electrodialysis of lithium ions.

Embodiments for implementing the lithium isotope concentration device and the lithium isotope concentration method according to the present invention are described with reference to the drawings. In the drawings, the size and the like of specific elements are exaggerated in order to clarify the description in some cases, and the shapes are simplified in some cases.

[Lithium Isotope Concentration Device]

As shown in FIG. 1, a lithium isotope concentration device 10 according to an embodiment of the present invention includes a treatment tank 1, an electrolyte membrane (lithium-ion conductivity electrolyte membrane) 2, a first electrode 31 and a second electrode 32 (electrodes) applied to the respective surfaces of the electrolyte membrane 2, a power supply device 5, and a cooling device 6. The treatment tank 1 is partitioned by the electrolyte membrane 2 into a supply tank (first tank) 11 which holds a Li-containing aqueous solution ASi and a recovery tank (second tank) 12 which holds a $^6Li$ recovery aqueous solution ASo. The power supply device 5 has a direct current power supply. The power supply has a positive (+) electrode connected to the first electrode 31 provided on the supply tank 11 side, and a negative (−) electrode connected to the second electrode 32 provided on the recovery tank 12 side. The cooling device 6 cools the electrolyte membrane 2 through the Li-containing aqueous solution ASi in the supply tank 11. Hereinafter, the elements included in the lithium isotope concentration device according to the embodiment of the present invention are described.

The treatment tank 1 is formed of a material that does not undergo alteration such as corrosion even when coming into contact with the Li-containing aqueous solution ASi and the $^6Li$ recovery aqueous solution ASo. In addition, the treatment tank 1 can have a capacity corresponding to required treatment ability, and the shape and the like are not particularly limited.

The electrolyte membrane 2 is an electrolyte having lithium-ion conductivity, and preferably does not conduct electrons $e^-$. Moreover, in a case where the Li-containing aqueous solution ASi contains metal ions other than $Li^+$, the electrolyte membrane 2 preferably does not conduct these metal ions. More preferably, the electrolyte membrane 2 is an electrolyte made of a ceramic having these properties. Specifically, such a material includes lithium lanthanum titanium oxide ($La_{2/3-x}Li_{3x}TiO_3$, also referred to as LLTO) and the like. Such an electrolyte membrane 2 has lattice defects in a certain proportion, and since the size of the lattice defect site is small, the electrolyte membrane 2 does not conduct metal ions having diameters larger than that of $Li^+$. For example, a solid electrolyte having a perovskite ($ABO_3$) structure (A=Li, La, or a void, B=Ti) such as LLTO has voids in part of the A site (A site defects). Then, as described in terms of a lithium isotope concentration method, which is described later, $Li^+$ gets into the A site defects, and $Li^+$ moves between the A site defects in the vicinity. Hereinafter, a site where Li can be present such as the A site is referred to as a Li site, and a Li site having voids is referred to as a Li site defect.

The first electrode 31 and the second electrode 32 are a pair of electrodes provided in contact with the respective surfaces of the electrolyte membrane 2 to apply a voltage through these surfaces. The first electrode 31 and the second electrode 32 have porous structures of net shape or the like so that these electrodes apply a voltage to a wide range of the electrolyte membrane 2 and also that the aqueous solutions ASi, ASo come into contact with sufficient areas of the respective surfaces of the electrolyte membrane 2. The first electrode 31 is provided on the surface of the electrolyte membrane 2 on the supply tank 11 side (hereinafter referred to as a front surface as appropriate), has catalytic activity corresponding to reaction of the formula (1) given below and electron conductivity, and is formed of an electrode material that is stable even during the application of a voltage in the Li-containing aqueous solution ASi, for example, platinum (Pt). The second electrode 32 is provided on the surface of the electrolyte membrane 2 on the recovery tank 12 side (hereinafter referred to as a back surface as appropriate), has catalytic activity corresponding to reaction of the formula (2) given below and electron conductivity, and is formed of an electrode material that is stable during the application of a voltage even in the $^6$Li recovery aqueous solution ASo that has contained Li$^+$ in the course of the reaction, for example, Pt.

[Chem. 1]

$$2Li^+(ASi) + 2OH^- \rightarrow 2Li^+(electrolyte) + H_2O + \frac{1}{2}O_2\uparrow + 2e^- \quad (1)$$

$$2Li^+(electrolyte) + 2H_2O + 2e^- \rightarrow 2OH^- + H_2\uparrow + 2Li^+(ASo) \quad (2)$$

The power supply device 5 is a direct current power supply device, and has a positive electrode connected to the first electrode 31 and a negative electrode connected to the second electrode 32 to apply a predetermined voltage V.

The cooling device 6 is provided in order to cause the electrolyte membrane 2 to have a predetermined temperature, and cools the electrolyte membrane 2 through the Li-containing aqueous solution ASi or the $^6$Li recovery aqueous solution ASo. As the cooling device 6, a known device for cooling a liquid can be employed, and the cooling device 6 preferably has a temperature adjustment function. In the present embodiment, the cooling device 6 is of feed-in type (immersion type), and pipe (coolant pipe) through which the coolant circulates is immersed and set in the Li-containing aqueous solution ASi in the supply tank 11. The cooling device 6 is able to cause the electrolyte membrane 2 to have a certain temperature and does not have to cause the Li-containing aqueous solution ASi or the $^6$Li recovery aqueous solution ASo to have a uniform solution temperature. However, the cooling device 6 can be equipped with a stirring device depending on the capacity of the treatment tank 1 or the like. Although the detail is described later, the temperature of the electrolyte membrane 2 is set to 30° C. or lower and 0° C. or higher so that the aqueous solutions ASi, ASo should not be frozen, for example, in the case where the $^6$Li recovery aqueous solution ASo is pure water at the time of starting the operation of the lithium isotope concentration device 10 (starting the electrodialysis). As the temperature of the electrolyte membrane 2, the solution temperature of the Li-containing aqueous solution ASi or the $^6$Li recovery aqueous solution ASo can be measured as a substitute. The coolant pipe of the cooling device 6 is formed of a material that does not undergo alteration such as corrosion even when coming into contact with the Li-containing aqueous solution ASi or the $^6$Li recovery aqueous solution ASo as in the case of the treatment tank 1, and the shape and the like are not limited. For example, in order to efficiently cool the electrolyte membrane 2, the coolant pipe is set in such a manner as to meander in plane in conformity to the dimensions of the plate-shaped electrolyte membrane 2 to face a wide area of the electrolyte membrane 2 in the vicinity. In addition, a coolant pipe may be fed in both of the supply tank 11 and the recovery tank 12 depending on the thickness of the electrolyte membrane 2 or the like. Moreover, the cooling device 6 can be configured such that the treatment tank 1 has a double structure (jacket tank), and the coolant is circulated in the inside (jacket portion) of the double structure. Alternatively, it is possible to employ a configuration in which the Li-containing aqueous solution ASi or the $^6$Li recovery aqueous solution ASo is circulated to the outside of the treatment tank 1 by using a pump and cooled by using a heat exchanger.

The Li-containing aqueous solution ASi is a Li source, is an aqueous solution containing cations $^7$Li$^+$, $^6$Li$^+$ of $^7$Li and $^6$Li, is, for example, an aqueous solution of lithium hydroxide (LiOH), and contains $^7$Li$^+$, $^6$Li$^+$ at a natural abundance at the time of starting the operation of the lithium isotope concentration device 10. The $^6$Li recovery aqueous solution ASo is an aqueous solution for holding lithium ions Li$^+$ recovered from the Li-containing aqueous solution ASi, particularly $^6$Li$^+$ in a large amount, and is, for example, pure water at the time of starting the operation of the lithium isotope concentration device 10. Note that in the present Specification, in a case where $^7$Li and $^6$Li ($^7$Li$^+$ and $^6$Li$^+$) are not distinguished from each other, $^7$Li and $^6$Li ($^7$Li$^+$ and $^6$Li$^+$) are collectively referred to as Li (Li$^+$).

[Lithium Isotope Concentration Method]

A lithium isotope concentration method according to the embodiment of the present invention is described. First of all, electrodialysis of lithium ions by using the lithium isotope concentration device according to the embodiment is described with reference to FIG. 2. Note that in the lithium isotope concentration device 10 shown in FIG. 2, the cooling device 6 is omitted.

In the lithium isotope concentration device 10, when the power supply device 5 applies a positive voltage +V to the first electrode 31 relative to the second electrode 32, hydroxide ions (OH$^-$) in the Li-containing aqueous solution ASi cause reaction of the formula (3) given below near the first electrode 31, so that electrons e$^-$ are released to the first electrode 31, where water (H$_2$O) and oxygen (O$_2$) are generated. In the Li-containing aqueous solution ASi, along with a decrease of OH$^-$, reaction of the formula (4) given below by which Li$^+$ in the Li-containing aqueous solution ASi moves into the electrolyte membrane 2 occurs near the electrolyte membrane 2 in order to maintain the balance of charges. To put the reactions of the formula (3) and the formula (4) given below together, it means that reaction of the formula (1) given below occurs near the first electrode 31. On the other hand, near the second electrode 32, H$_2$O in the $^6$Li recovery aqueous solution ASo is supplied with electrons e$^-$ to cause reaction of the formula (5) given below, which generates hydrogen (H$_2$) and OH$^-$. In the $^6$Li recovery aqueous solution ASo, along with an increase of OH$^-$, reaction of the formula (6) given below by which Li$^+$ in the electrolyte membrane 2 moves thereto occurs near the electrolyte membrane 2 in order to maintain the balance of charges. To put the reactions of the formula (5) and the formula (6) given below together, it means that the reaction of the formula (2) given below occurs near the second electrode 32.

[Chem. 2]

$$2OH^- \rightarrow H_2O + \frac{1}{2}O_2\uparrow + 2e^- \quad (3)$$

$$Li^+(ASi) \rightarrow Li^+(electrolyte) \quad (4)$$

$$2Li^+(ASi) + 2OH^- \rightarrow 2Li^+(electrolyte) + H_2O + \frac{1}{2}O_2\uparrow + 2e^- \quad (1)$$

$$2H_2O + 2e^- \rightarrow 2OH^- + H_2\uparrow \quad (5)$$

$$Li^+(electrolyte) \rightarrow Li^+(ASo) \quad (6)$$

$$2Li^+(electrolyte) + 2H_2O + 2e^- \rightarrow 2OH^- + H_2\uparrow + 2Li^+(ASo) \quad (2)$$

Figure 3A:
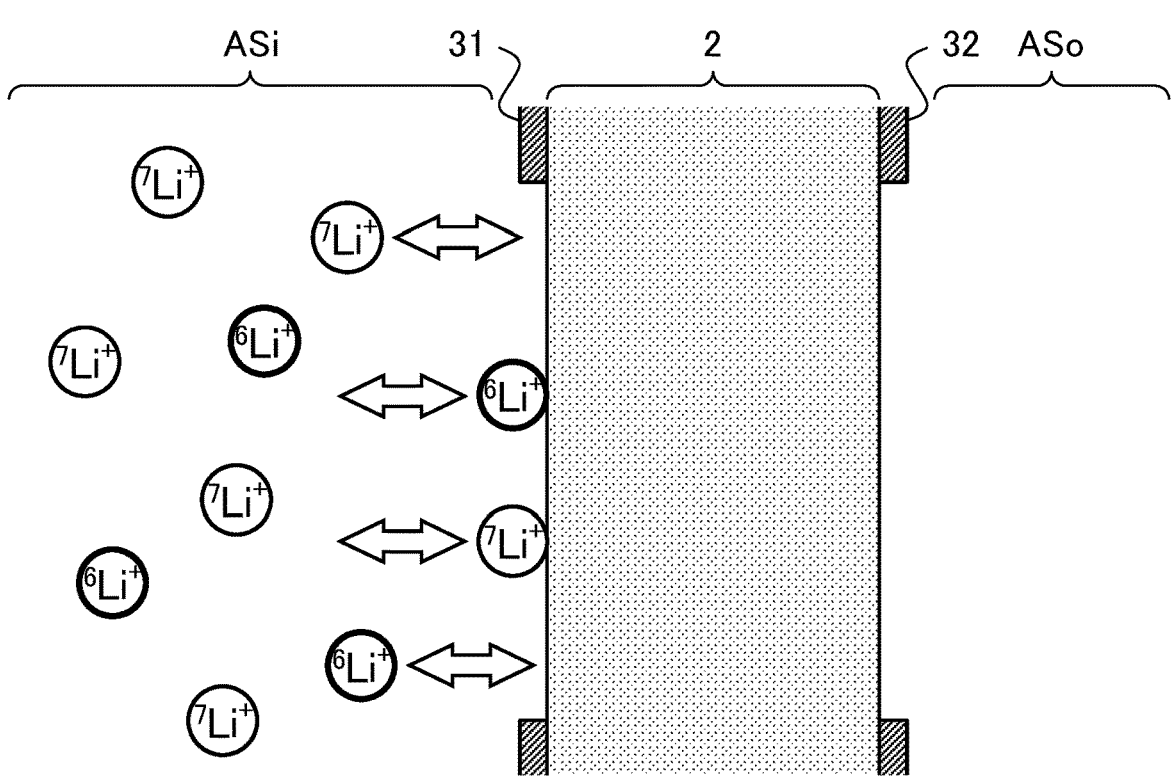
FIG. 3A is an enlarged view of a main part for explaining a behavior of lithium ions in an initial state in the electrodialysis of the lithium ions using the lithium isotope concentration device shown in FIG. 1.
Figure 3B:
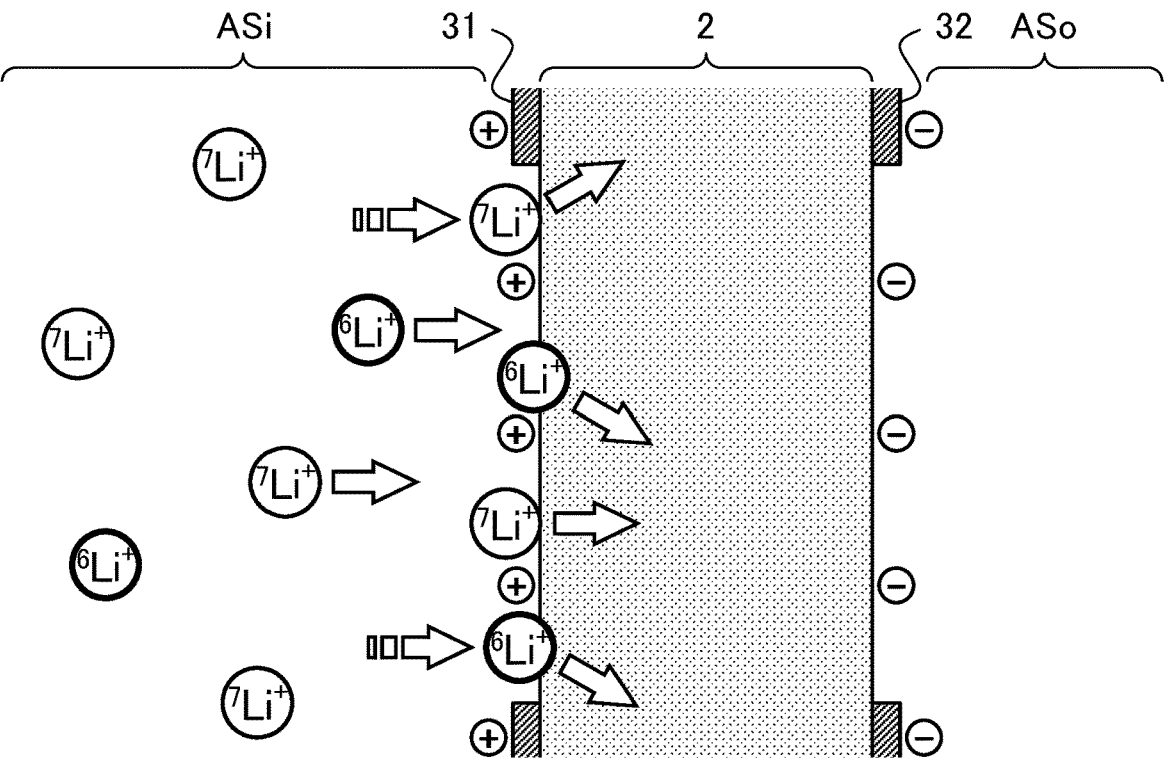
FIG. 3B is an enlarged view of the main part for explaining a behavior of the lithium ions immediately after start of movement in the electrodialysis of the lithium ions using the lithium isotope concentration device shown in FIG. 1.
Figure 3C:
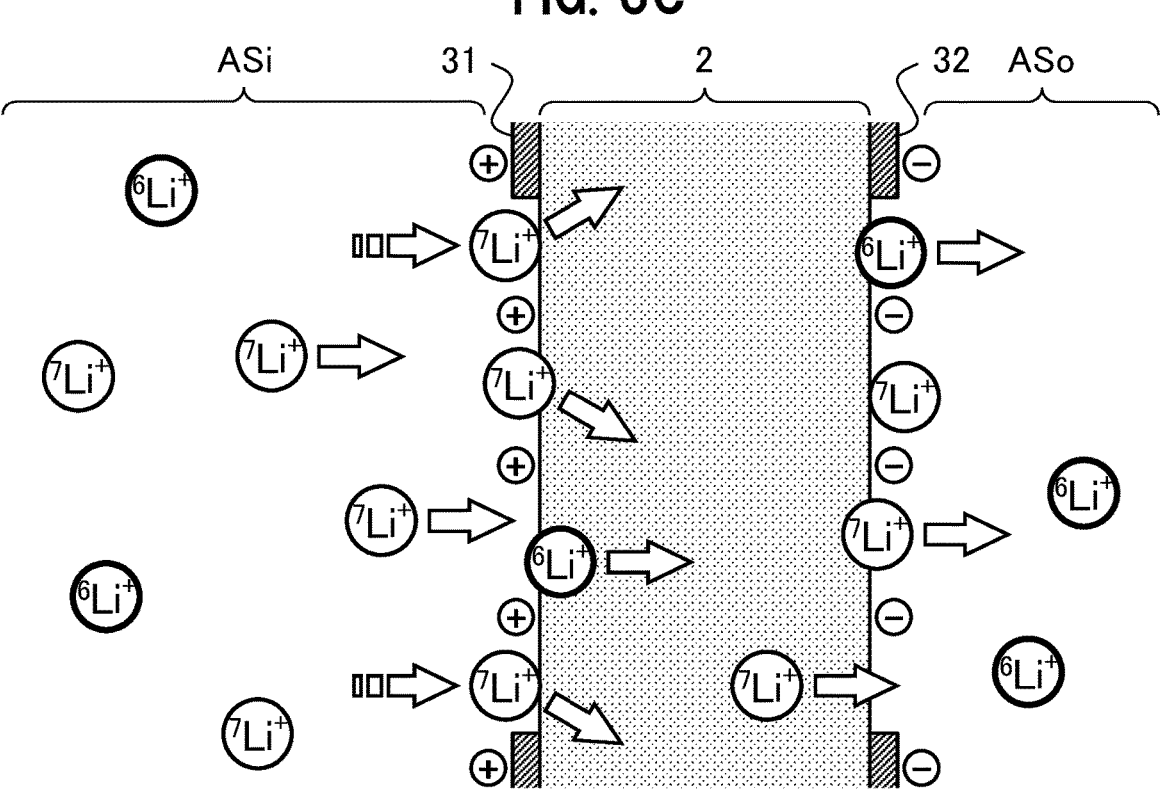
FIG. 3C is an enlarged view of the main part for explaining a behavior of the lithium ions during movement in the electrodialysis of the lithium ions using the lithium isotope concentration device shown in FIG. 1.

Once these reactions occur, $Li^+$ in the Li-containing aqueous solution ASi passes through the electrolyte membrane 2 and moves into the $^6Li$ recovery aqueous solution ASo due to differences in electrochemical potential of $Li^+$ ($Li^+$ (ASi), $Li^+$ (electrolyte), $Li^+$ (ASo)) contained respectively in the Li-containing aqueous solution ASi, the electrolyte membrane 2 (electrolyte), and the $^6Li$ recovery aqueous solution ASo. These reactions become faster as the amounts of movement per time of electrons $e^-$ respectively from the Li-containing aqueous solution ASi to the first electrode 31 and from the second electrode 32 to the $^6Li$ recovery aqueous solution ASo become more. Hence, the larger the voltage +V is, the more the amount per time of $Li^+$ (mobility) moving from the first electrode 31 side to the second electrode 32 side in the electrolyte membrane 2 is. However, in practice, when the voltage +V is large to some extent, the electrolyte membrane 2 comes to conduct electrons $e^-$ as well. For this reason, although the mobility of $Li^+$ continues to increase, the voltage dependency decreases. Here, the behavior of $Li^+$ at the time of passing through the electrolyte membrane 2 is described in detail with reference to FIGS. 3A to 3C. FIGS. 3A to 3C are each an enlarged cross-sectional view of the vicinity of the electrolyte membrane 2 of the lithium isotope concentration device 10, and the electrodes 31, 32 are partially in contact with the respective surfaces of the electrolyte membrane 2. In addition, the aqueous solutions ASi, ASo are expressed such that only $^7Li^+$, $^6Li^+$ contained therein are enclosed with ○.

When no voltage is applied, as shown in FIG. 3A, $^7Li^+$, $^6Li^+$ float in the Li-containing aqueous solution ASi and alternately repeat adsorption and desorption into and from the front surface of the electrolyte membrane 2. From this state, as shown in FIG. 3B, voltage of + is applied to the first electrode 31 and voltage of − to the second electrode 32. Note that in the drawings, positive charges are represented by + enclosed in ○ and negative charges are represented by − enclosed in ○. Thereafter, $Li^+$ ($^7Li^+$, $^6Li^+$) in the Li-containing aqueous solution ASi is about to be dissolved in the electrolyte membrane 2 as the reaction of the above-described formula (4). At this time, $Li^+$ adsorbed near the Li site defect in the front surface of the electrolyte membrane 2 gets into this Li site defect. Then, since the electrolyte membrane 2 has a potential gradient in which the potential is lower in the back surface side than in the front surface side due to the electrodes 31, 32, $Li^+$ which has gotten into the Li site defect of the front surface jumps (hops) to a Li site defect in the vicinity on the deeper side of the electrolyte membrane 2. In this way, $Li^+$ repeatedly moves from a Li site defect to another Li site defect in the vicinity in the electrolyte membrane 2, and eventually moves from a Li site defect in the back surface into the $^6Li$ recovery aqueous solution ASo as the reaction of the above-described formula (6) as shown in FIG. 3C.

In addition, in the front surface of the electrolyte membrane 2, since $Li^+$ adsorbed near a Li site defect has moved into the deeper portion of the electrolyte membrane 2, other $Li^+$ adsorbed in the vicinity moves to and gets into the Li site defect which has thus been emptied, or new $Li^+$ is adsorbed from inside the Li-containing aqueous solution ASi, and these $Li^+$ similarly move in the electrolyte membrane 2. Moreover, since the movement of $Li^+$ in the electrolyte membrane 2 causes a Li site defect to be buried by $Li^+$ or be again emptied, $Li^+$ adsorbed in the front surface can start moving to the back surface side through Li site defects newly generated in the front surface of the electrolyte membrane 2.

Figure 4:
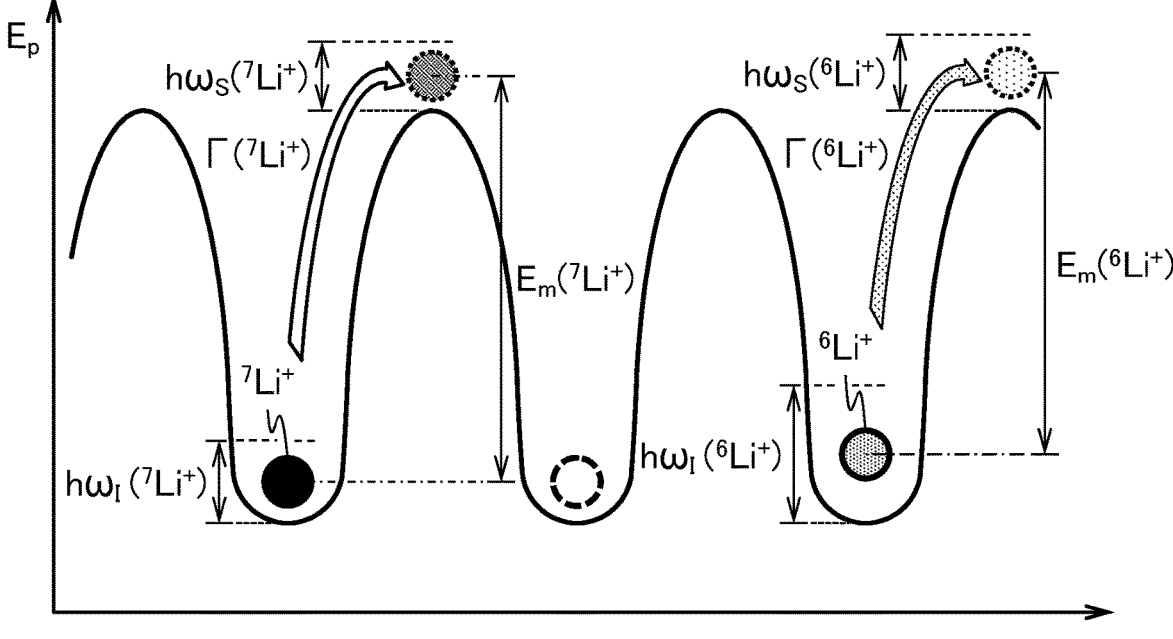
FIG. 4 is a model for explaining ion conduction in the electrolyte.

The movement of $Li^+$ between sites in the electrolyte membrane 2 (hopping) is described in further detail with reference to FIG. 4. FIG. 4 is a model for explaining ion conduction in an electrolyte, where x represents the position in the thickness direction of the electrolyte membrane 2, and Ep represents potential energy. In the electrolyte membrane 2, $Li^+$ ($^7Li^+$, $^6Li^+$) is stably present in a Li site where the potential energy is the minimum. When a Li site in the vicinity is a void (represented by dashed ○) and $Li^+$ receives energy equal to or more than the activation energy $E_a$, $Li^+$ can jump (hop) across the energy barrier $E_m$ between the sites and moves to this site defect ($E_a=E_D/2+E_m$, $E_D$: the defect formation energy). In addition, it can be assumed that ions are thermally vibrating at a frequency $\Gamma_0$ at a position with the minimum potential energy, and ions can hop at a frequency (hopping rate $\Gamma$) corresponding to this frequency (frequency factor) $\Gamma_0$. The frequency $\Gamma_0$ is in inverse proportion to the square root of mass of ions. $^6Li$ has a small mass that is 6/7 times that of $^7Li$, and thus $^6Li$ has a the frequency $\Gamma_0$ ($\sqrt{(7/6)}$) times that of $^7Li$. Accordingly, the average moving speed of $^6Li$ in the electrolyte membrane 2 is ($\sqrt{(7/6)}$) times faster than that of $^7Li$, which is described later in detail. In addition, for example, in a case where $^7Li^+$ and $^6Li^+$ are present respectively at two positions in the vicinity of and equidistant to a certain Li site defect in the electrolyte membrane 2, it is surmised that $^6Li^+$ preferentially jumps to the Li site defect.

Figure 5:
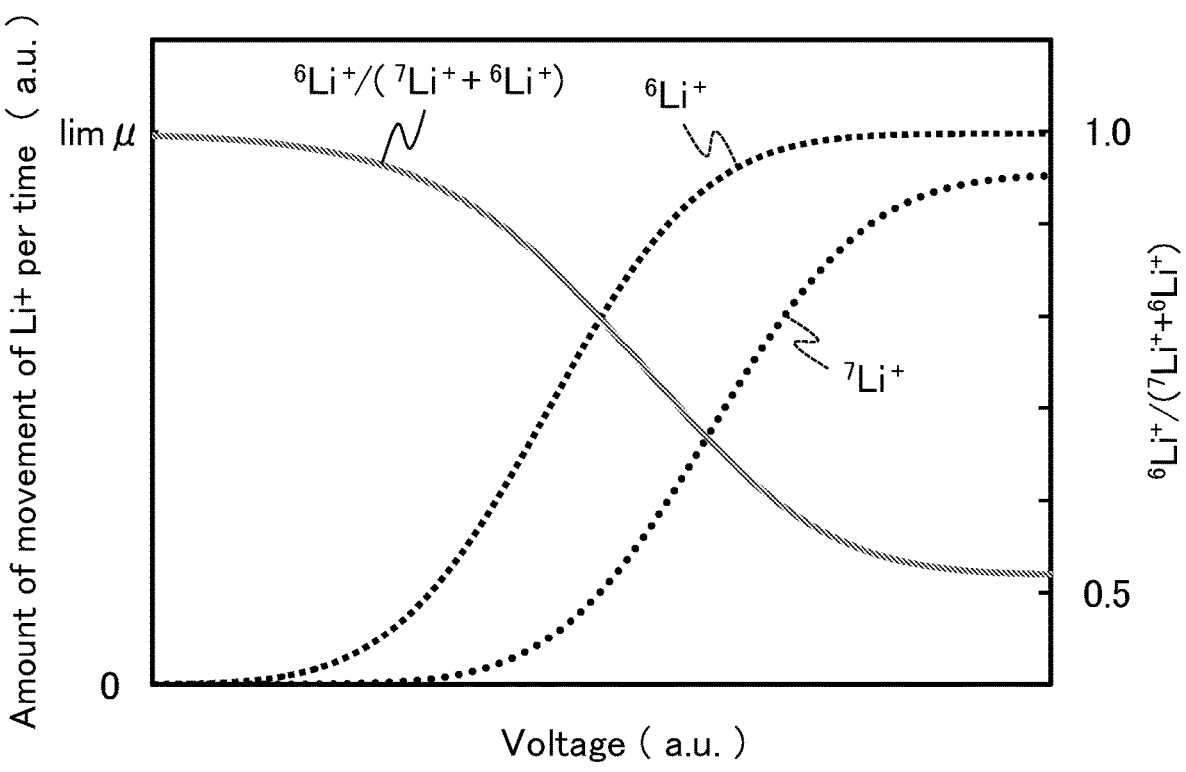
FIG. 5 is a graph for explaining amounts of movement per time and applied voltage dependency of an isotope ratio in electrodialysis of lithium ions in a simulation.

In addition, $^7Li^+$, $^6Li^+$ in a Li site of the electrolyte membrane 2, that is, in the ground state, have potential energies higher by the zero-point vibration hex. The zero-point vibration $h\omega_1$ depends on isotopes, and $^6Li^+$ has higher zero-point vibration $h\omega_1$ than that of $^7Li^+$. Similarly, in the excited state as well, $^6Li^+$ has higher zero-point vibration $h\omega_S$. Hence, $^6Li^+$, which has a smaller mass than that of $^7Li^+$, has higher potential energies in consideration of the zero-point vibrations $h\omega_1$, $h\omega_S$ in both the ground state and the excited state. However, $^6Li^+$ has a smaller energy barrier $E_m$, which is a difference in potential energy between the excited state and the ground state ($E_m(^7Li^+)>E_m(^6Li^+)$), that is, $^6Li^+$ has a smaller activation energy $E_a$. As a result, $^6Li^+$ can hop even when the received energy is smaller than that for $^7Li^+$. As the excess in the received energy relative to the activation energy $E_a$ is more, the amount of movement of the $Li^+$ per time, that is, the mobility μ increases. Hence, as the applied voltage +V is increased, the mobility of $Li^+$ increases. In addition, $^6Li^+$ has an equivalent excess energy relative to the activation energy $E_a$ with smaller voltage +V than that for $^7Li^+$, and at this time, $^6Li^+$ has a mobility μ higher by the ratio of the frequency FO. FIG. 5 shows amounts of movement of $^6Li^+$, $^7Li^+$ per time and the applied voltage dependency of the isotope ratio of mobile $Li^+$ obtained in a simulation. In the simulation, the distribution of the activation energy $E_a$ in accordance with the Maxwell-Boltzmann distribution was approximated with normal distribution. Specifically, for each of $^6Li^+$, $^7Li^+$, the proportion of $Li^+$ which exceeded the activation energy $E_a$ (on the premise of $^6Li^+<^7Li^+$) was calculated for each received energy from the probability density of the normal distribution having the activation energy $E_a$ as an average value, and the accumulated value was multiplied by the ratio of the frequency FO to obtain a relative value of the mobility μ. The isotope ratio was calculated on the premise that the abundance ratio of $^7Li^+$ and $^6Li^+$ before movement was 1:1 for simplifying the simulation.

As shown in FIG. 5, the mobility of each of $^6Li^+$, $^7Li^+$ increases in S-shaped curve from 0 as the applied voltage +V increases. $^6Li^+$, which has an activation energy $E_a$ smaller than that of $^7Li^+$, changes while shifting toward the smaller side of the voltage +V relative to $^7Li^+$, and is higher than $^7Li^+$ by the ratio of the frequency FO. Note that limμ in FIG. 5 represents the limit of the amount of movement of $^6Li^+$ per time. Hence, the smaller the applied voltage +V in the range where $^6Li^+$ is moved in the electrolyte membrane 2 is, the more $^6Li^+$ moves relative to $^7Li^+$. Then, when the applied voltage +V increases and the mobilities of $^6Li^+$, $^7Li^+$ converge, the difference between them decreases, and the isotope ratio converges to $(\sqrt{(7/6)})/(1+\sqrt{(7/6)})$. However, in practice, it is considered that when the voltage +V is increased, the voltage dependency significantly decreases before the mobilities of $^6Li^+$, $^7Li^+$ reach the limits as shown in FIG. 5. Particularly, as described above, if the voltage applied between the opposite surfaces of the electrolyte membrane 2 increases to a certain value or more, part of transition metal ions forming the electrolyte membrane 2 is reduced (for example, when the electrolyte membrane 2 is formed of LLTO, $Ti^{4+}+e^- \rightarrow Ti^{3+}$), and the electrolyte membrane 2 starts conducting electrons $e^-$ from the recovery tank 12 side to the supply tank 11 side. As a result, since most of the given electric energy is consumed for the conduction of electrons $e^-$, the voltage dependency of the mobility of $Li^+$ decreases, and the energy efficiency in movement of $Li^+$ decreases. Moreover, reduction of part of the transition metal ions forming the electrolyte membrane 2 causes the ion radius of the reduced ions to increase (for example, when the electrolyte membrane 2 is formed of LLTO, $Ti^{4+}<Ti^{3+}$), and the bottle neck for movement of $Li^+$ expands, so that the $^6Li$ isotope ratio of $Li^+$ being moved rapidly decreases. In addition, since the temperature of the electrolyte membrane 2 is increased by Joule heat generated by electrons $e^-$ conducted in the electrolyte membrane 2, the $^6Li$ isotope ratio of $Li^+$ being moved decreases as described later. Specifically, although it depends on the electron conductivity of the electrolyte membrane 2 and the like, when voltage of more than 2.0 V is applied, the electrolyte membrane 2 can exhibit electron conductivity. Hence, the voltage +V is preferably 2.0 V or less. Moreover, since a smaller applied voltage leads to a larger isotope separation coefficient, the voltage +V is more preferably 1.5 V or less, and further preferably 1.0 V or less. On the other hand, the lower limit of the voltage +V is not particularly specified as long as $Li^+$ can be moved in the electrolyte membrane 2. For example, although it depends on the electron conductivity of electrolyte membrane 2, the concentrations of hydrogen ions of the aqueous solutions ASi, ASo, and the like, the lower limit of the voltage +V is preferably set within a range of 0.5 V or more. However, since the smaller the applied voltage +V is, the lower the mobility μ of $Li^+$ is, it is preferable to set the lower limit of the voltage +V to such an extent that the productivity does not become too low.

In addition, the ion mobility μ is related to the diffusion coefficient D of the ions in the formula (7) given below (T: the temperature (K), k: the Boltzmann constant). The diffusion coefficient D is in proportion to the hopping rate F as expressed by the formula (8) given below (a: the average distance between sites (jump length), the carrier density, f: the coefficient of correlation effect determined by the ions and their surroundings, d: the dimension of the diffusion field). In addition, since the frequency factor FO in the formula (8) is in proportion to the temperature T as expressed by the formula (9) given below, and $(Z_s^{vib}/Z_I^{vib})$ is in inverse proportion to the square root of the mass number m, the frequency factor $\Gamma_0$ is in inverse proportion to the square root of the mass number m (h: the Planck constant, $Z_s^{vib}$: the phonon dispersion at the saddle point, $Z_I^{vib}$: the phonon dispersion in the initial state, $C_1$: a constant). From the formula (8) and the formula (9), the diffusion coefficient D is expressed by the formula (10) given below. Then, from the formula (7) and the formula (10), the ion mobility μ is expressed by the formula (11) given below ($C_2$: a constant). As shown by the formula (11), $^6Li^+$ which has a smaller mass number m and activation energy $E_a$ has a higher ion mobility μ than $^7Li^+$. Then, the ion mobility μ depends on the temperature T, and the degree of the dependence is affected by the activation energy $E_a$.

[Math. 1]

$$kT\mu = D \tag{7}$$

$$D = \frac{a^2 n_c f}{2d}\Gamma = \frac{a^2 n_c f}{2d}\Gamma_0 \exp\left(\frac{-E_a}{kT}\right) \tag{8}$$

$$\Gamma_0 = \frac{kT}{h}\frac{Z_s^{vib}}{Z_I^{vib}} = \frac{kT}{h}\frac{C_1}{\sqrt{m}} \tag{9}$$

$$D = \frac{a^2 n_c f}{2d}\frac{kT}{h}\frac{C_1}{\sqrt{m}}\exp\left(\frac{-E_a}{kT}\right) \tag{10}$$

$$\mu = \frac{D}{kT} = \frac{a^2 n_c f}{2dh}\frac{C_1}{\sqrt{m}}\exp\left(\frac{-E_a}{kT}\right) = \frac{C_2}{\sqrt{m}}\exp\left(\frac{-E_a}{kT}\right) \tag{11}$$

Figure 6A:
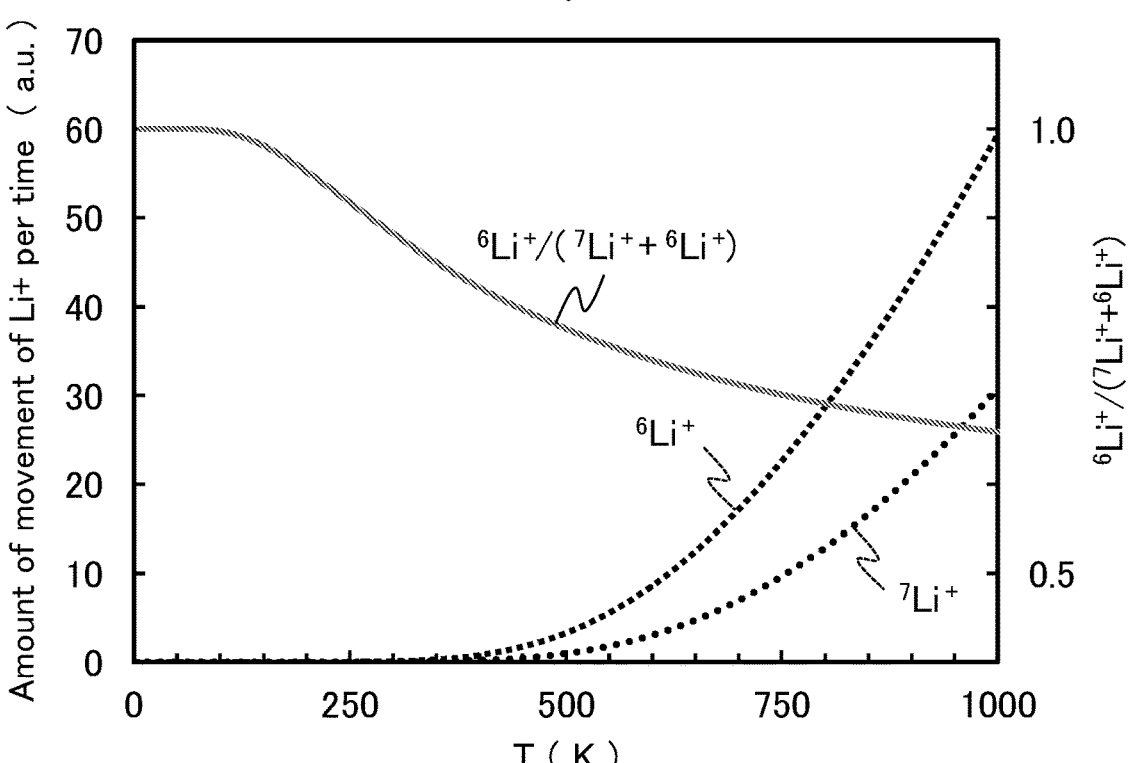
FIG. 6A is a graph for explaining amounts of movement per time and temperature dependency of an isotope ratio in electrodialysis of lithium ions in a simulation.

Based on the formula (11), for the temperature dependency, the relative amounts of movement of $^7Li^+$, $^6Li^+$ per time and the isotope ratio of mobile $Li^+$ were calculated, and are shown in FIG. 6A. The calculation was made on the premise that the activation energies $E_a$ of $^7Li^+$ and $^6Li^+$ were 0.30 eV and 0.25 eV, respectively. The isotope ratio was calculated on the premise that the abundance ratio of $^7Li^+$ and $^6Li^+$ before the movement was 1:1 as in the case of the simulation of the voltage dependency. As shown in FIG. 6A, although the mobility of each of $^7Li^+$, $^6Li^+$ exponentially increases as the temperature increases, $^7Li^+$ having a larger activation energy $E_a$ has larger temperature dependency. Hence, as the temperature increases, the ratio between $^7Li^+$ having a low mobility and $^6Li^+$ having a high mobility becomes smaller. Particularly, as shown in FIG. 6A, the isotope ratio of $^6Li$ rapidly drops from near 1 in a low temperature region where the mobility is very low, and decreases while becoming more gradual as the temperature increases, and converges to $(\sqrt{(7/6)})/(1+\sqrt{(7/6)})$. In this way, the lower the temperature is, the higher the proportion of $^6Li^+$ in moving $Li^+$ is.

Figure 6B:
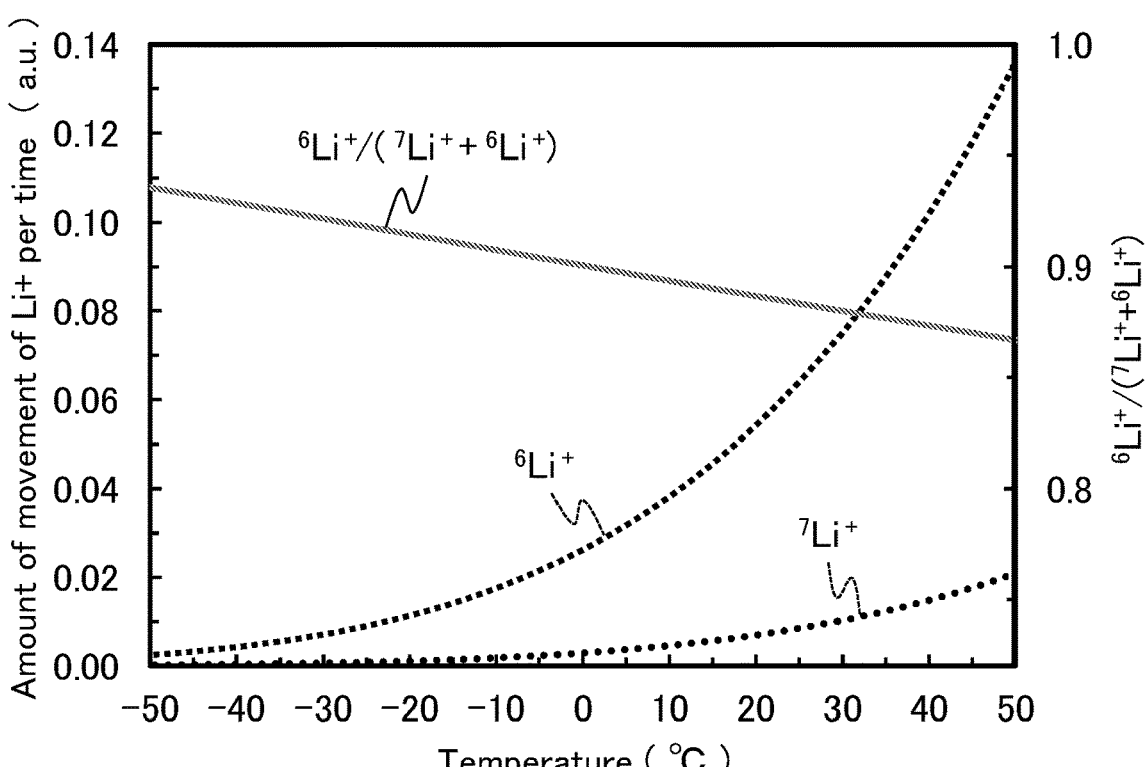
FIG. 6B is a partially enlarged diagram of FIG. 6A.

The temperature range which can be employed in the present embodiment is equal to or more than the coagulation points and less than the boiling points of the aqueous solutions ASi, ASo, and is 0 to 100° C. in the case where the $^6Li$ recovery aqueous solution ASo is pure water at the time of starting the electrodialysis. FIG. 6B shows an enlarged diagram from −50 to 50° C. in FIG. 6A. As shown in FIG. 6B, in the temperature range which can be employed in the present embodiment, the temperature dependency of the isotope ratio of $^6Li$ is substantially linear, and becomes higher as the temperature becomes lower. Accordingly, the temperature of the electrolyte membrane 2 is preferably 20° C. or less, more preferably 15° C. or less, further preferably 10° C. or less, and still further preferably 5° C. or less.

In the lithium isotope concentration method according to the present embodiment, as the voltage application time elapses, the isotope ratio of $^6Li$ in $Li^+$ remaining in the Li-containing aqueous solution ASi ($^6Li/(^7Li+^6Li)$) decreases. For this reason, the isotope ratio of $^6Li$ in newly moving $Li^+$ decreases. In view of this, in order to more efficiently concentrate $^6Li$, for example, when the $^6Li$ recovery aqueous solution ASo reaches a predetermined $Li^+$ concentration, or when a predetermined voltage application time elapses, the Li-containing aqueous solution ASi of the supply tank 11 may be replaced. In addition, in order to further increase the isotope separation coefficient, the voltage +V may be intermittently applied, or the voltage +V and an inverse voltage –V'(V>V') may be alternately applied such that the state where the isotope separation coefficient is large immediately after the start of the application of voltage (operation) is repeated (see Patent Literature 2, Non-Patent Literature 1). For the $^6Li$ recovery aqueous solution ASo after the completion of electrodialysis, for example, $^6Li$ can be recovered by evaporating the water content to concentrate Li, and then generating lithium carbonate ($Li_2CO_3$) by carbon dioxide gas ($CO_2$) bubbling or the like, followed by precipitation. Alternatively, $^6Li$ can be recovered by generating lithium carbonate, and further causing oversaturated state by cooling or evaporating the water content to generate lithium hydroxide (LiOH), followed by precipitation.

(Modification)

In the lithium isotope concentration method according to the present embodiment, it is possible to recover $^6Li$ while increasing the isotope ratio of $^6Li$ as the temperature of the electrolyte membrane 2 is lower (see FIG. 6A, FIG. 6B). However, it is necessary to cool at a temperature equal to or higher than the coagulation point so that the Li-containing aqueous solution ASi or the $^6Li$ recovery aqueous solution ASo would not be frozen. In view of this, the aqueous solutions ASi, ASo, particularly the $^6Li$ recovery aqueous solution ASo may contain a solute that does not pass through the electrolyte membrane 2 so that the coagulation point is lowered to below 0° C. Such a solute should be one which the aqueous solution ASi, ASo containing does not corrode the electrolyte membrane 2, the electrode 31, 32, and the like. Specifically, such solute includes salts such as sodium chloride (NaCl, common salt), magnesium chloride ($MgCl_2$), calcium chloride ($CaCl_2$)), and potassium chloride (KCl), and organic solvents such as ethylene glycol. As described above, in a case of bubbling carbon dioxide gas in order to recover $^6Li$ from the $^6Li$ recovery aqueous solution ASo after the completion of electrodialysis, sodium chloride, which does not generate precipitates (carbonates) other than lithium carbonate and brings about a large decrease in coagulation point, is particularly preferable. Note that for the $^6Li$ recovery aqueous solution ASo, in the case where Li is concentrated by evaporating the water content before bubbling carbon dioxide gas, it is preferable to conduct bubbling after removing salts precipitated by reduction of the water content by using a general method such as filtration. Alternatively, for the recovered $^6Li$ recovery aqueous solution ASo, Li can be selectively recovered into pure water or the like by conducting normal electrodialysis or the like (see, for example, JP2019-141807) at 0° C. or higher, for example, a temperature equal to or higher than room temperature before bubbling of carbon dioxide gas. Such methods make it possible to efficiently concentrate $^6Li$ while further increasing the isotope ratio of $^6Li$ by cooling the electrolyte membrane 2 to 0° C. or lower, and more preferably lower than 0° C.

[Multi-Stage Lithium Isotope Concentration Device]

Figure 7:
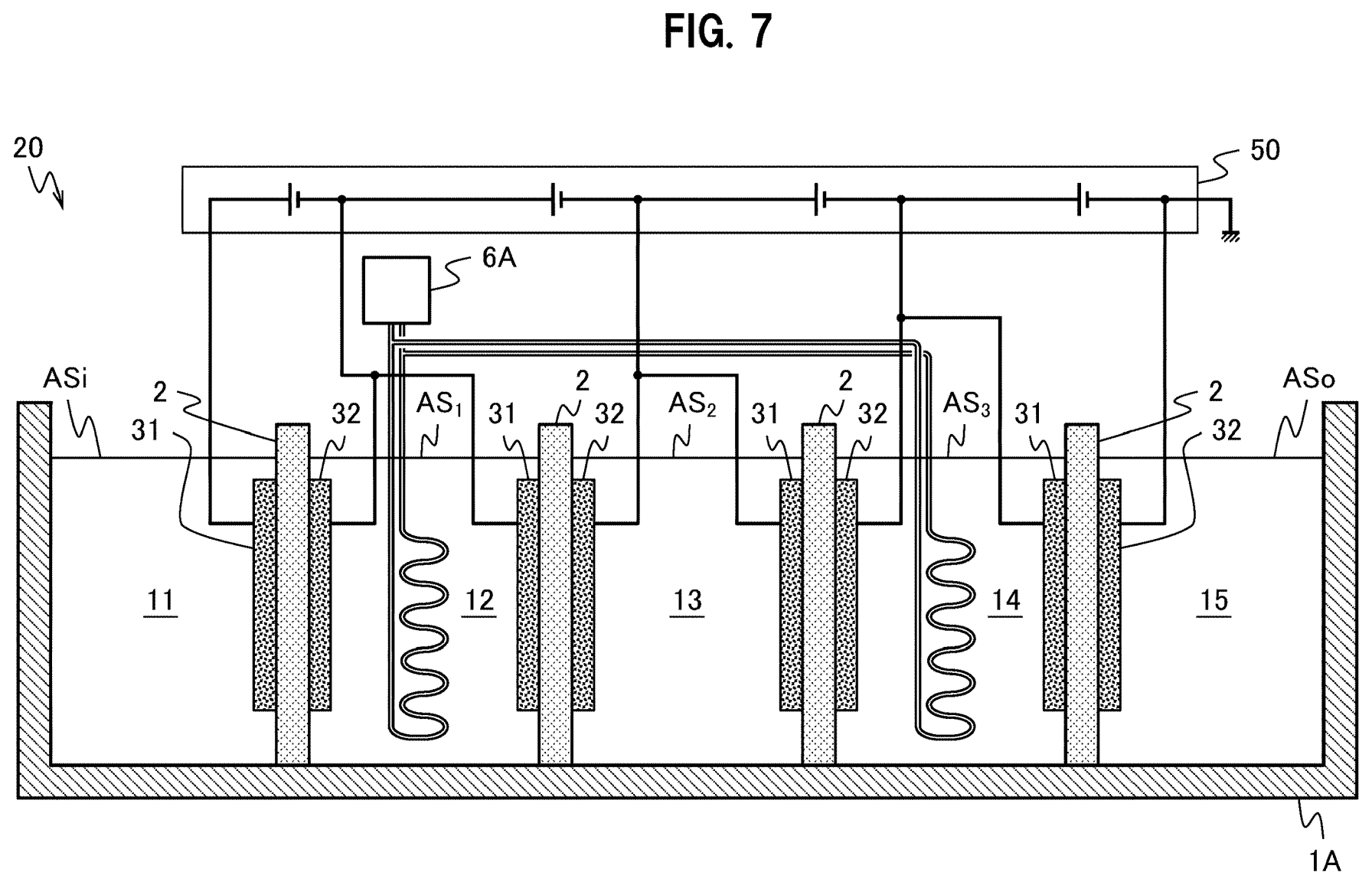

In the lithium isotope concentration device 10 according to the present invention, a Li-containing aqueous solution ($^6Li$ recovery aqueous solution ASo) with a higher isotope ratio of $^6Li$ than that of the Li-containing aqueous solution ASi in the supply tank 11 can be obtained in the recovery tank 12. In view of this, a Li-containing aqueous solution having a further higher isotope ratio of $^6Li$ can be obtained by feeding this $^6Li$ recovery aqueous solution ASo after the recovery of Li into an emptied supply tank 11. In view of this, as shown in FIG. 7, $^6Li$ can be concentrated stepwise by employing a cascade construction in which the recovery tank 12 of the lithium isotope concentration device 10 is coupled to a supply tank 11 of a different lithium isotope concentration device 10 in an integrating manner. Such a multi-stage lithium isotope concentration device 20 includes: a treatment tank 1A, four electrolyte membranes (lithium-ion conductivity electrolyte membranes) 2 arranged in parallel with intervals to partition the treatment tank 1A into five tanks 11, 12, 13, 14, in one direction respectively; a first electrode 31 and a second electrode 32 (electrodes) applied to the respective surfaces of each of the electrolyte membranes 2; a power supply device 50; and a cooling device 6A. The power supply device 50 includes the power supply devices 5 (see FIG. 1) of the lithium isotope concentration device 10 connected between the electrodes 31, 32 for the respective electrolyte membranes 2, in which neighboring ones of the power supply devices 5 are connected in series. Note that in the case of intermittently applying voltage, it is preferable to synchronize all the power supply devices 5. In addition, in the multi-stage lithium isotope concentration device 20, the second electrode 32 and the first electrode 31 which are provided respectively on the surfaces on the sides facing each other of two neighboring ones of the electrolyte membranes 2 are connected and short-circuited by using a conductor. The cooling device 6A includes two coolant pipes put in the tank 12 and the tank 14 in order to cool the four electrolyte membranes 2. Note that the number of the coolant pipes and the configuration of the cooling device 6A are not limited as long as all the electrolyte membranes 2 can be cooled to a predetermined temperature. Each of the other elements is as described in terms of the configuration of the lithium isotope concentration device 10. That is, the multi-stage lithium isotope concentration device 20 has a construction in which four of the lithium isotope concentration devices 10 are coupled each other such that the respective treatment tanks 1 are integrated into the treatment tank 1A. The recovery tank 12 of one of neighboring two of the lithium isotope concentration devices 10, 10 also serves as the supply tank 11 of the other.

The lithium isotope concentration method using the multi-stage lithium isotope concentration device 20 is the same as the method using the lithium isotope concentration device 10. The Li-containing aqueous solution ASi containing $^7Li$, $^6Li$ at a natural abundance is fed in the supply tank 11 at the left end in FIG. 7, and pure water is fed in each of the other tanks 12, 13, 14, 15. The multiple power supplies of the power supply device 50 apply a positive voltage +V. This makes $Li^+$ move from left to right in FIG. 7, and pure waters in the respective tanks 12, 13, 14, 15 turn to aqueous solutions $AS_1$, $AS_2$, $AS_3$, ASo containing Li at different concentration in which the isotope ratios of $^6Li$ are different. The isotope ratios of $^6Li$ are higher in the order of $ASi<AS_1<AS_2<AS_3<ASo$. Hence, even when the isotope separation coefficient with the movement of $Li^+$ in a single electrolyte membrane 2 is not large, it is possible to recover Li having a high isotope ratio of $^6Li$. Therefore, it is unnecessary to significantly reduce the mobility of $Li^+$ by using a low temperature or a low voltage, and the productivity can be enhanced.

For the multi-stage lithium isotope concentration device 20, the numbers of the electrolyte membranes 2 as well as the first electrodes 31 and the second electrodes 32 provided for the respective electrolyte membranes 2 are not particularly limited. As the numbers of these are larger, that is, as a larger number of the lithium isotope concentration devices 10 are coupled, Li having a higher isotope ratio of $^6$Li can be recovered. In addition, in FIG. 7, the multi-stage lithium isotope concentration device has the structure in which the lithium isotope concentration devices 10 are coupled in one direction and are arranged such that all the neighboring electrolyte membranes 2, 2 face each other. Meanwhile, for example, the lithium isotope concentration devices 10 can be coupled each other while being bent at 90° at one or two positions, so that the neighboring electrolyte membranes 2, 2 are arranged to be perpendicular to each other.

Example

Regarding the lithium isotope concentration device and the lithium isotope concentration method according to the present invention, embodiments for implementing the present invention have been described above. Hereinafter, Example in which the advantageous effect of the present invention was confirmed is described. Note that the present invention is not limited to this Example and the above-described embodiments, and it goes without saying that those obtained by various changes, modifications, and the like based on these descriptions are also encompassed in the gist of the present invention.

Regarding the lithium isotope concentration device according to the embodiment of the present invention shown in FIG. 1, the amount of change in isotope ratio of lithium was measured while voltage application conditions were changed.

(Fabrication of Lithium Isotope Concentration Device)

For the lithium isotope concentration device, as the electrolyte membrane, a plate-shaped $La_{0.57}Li_{0.29}TiO_3$ having 50 mm×50 mm and a thickness of 0.5 mm (lithium-ion conducting ceramic LLTO, produced by TOHO TITANIUM CO., LTD.) was used. In regions of 19.5 mm×20.5 mm in center portions of the respective surfaces of this electrolyte membrane, as the first electrode and the second electrode, comb-shaped electrodes each having a thickness of 10 μm, a width of 0.5 mm, and an interval of 0.5 mm were formed. Moreover, leads for connecting the electrodes and the power supply were formed. The first electrode, the second electrode, and the leads were formed by screen-printing a Pt paste on the surfaces of the electrolyte membrane, followed by baking at 900° C. for 1 h. The electrolyte membrane on which the electrodes and the like were formed was set in the treatment tank formed of acrylic plates to partition the treatment tank into the supply tank and the recovery tank, and the treatment tank is accommodated in a constant-temperature tank having a temperature adjustment function to obtain the lithium isotope concentration device.

Into the supply tank of the lithium isotope concentration device, 150 ml of 1 mol/l lithium hydroxide aqueous solution containing Li in a ratio of $^7$Li: 92.23 mol %, $^6$Li: 7.77 mol % was fed as the Li-containing aqueous solution, and into the recovery tank of the lithium isotope concentration device, 150 ml of pure water was fed in as the $^6$Li recovery aqueous solution such that the first electrode and the second electrode were completely immersed. Then, the solution temperatures of the lithium hydroxide aqueous solution and the pure water in the treatment tank were adjusted to 20° C.

Figure 8:
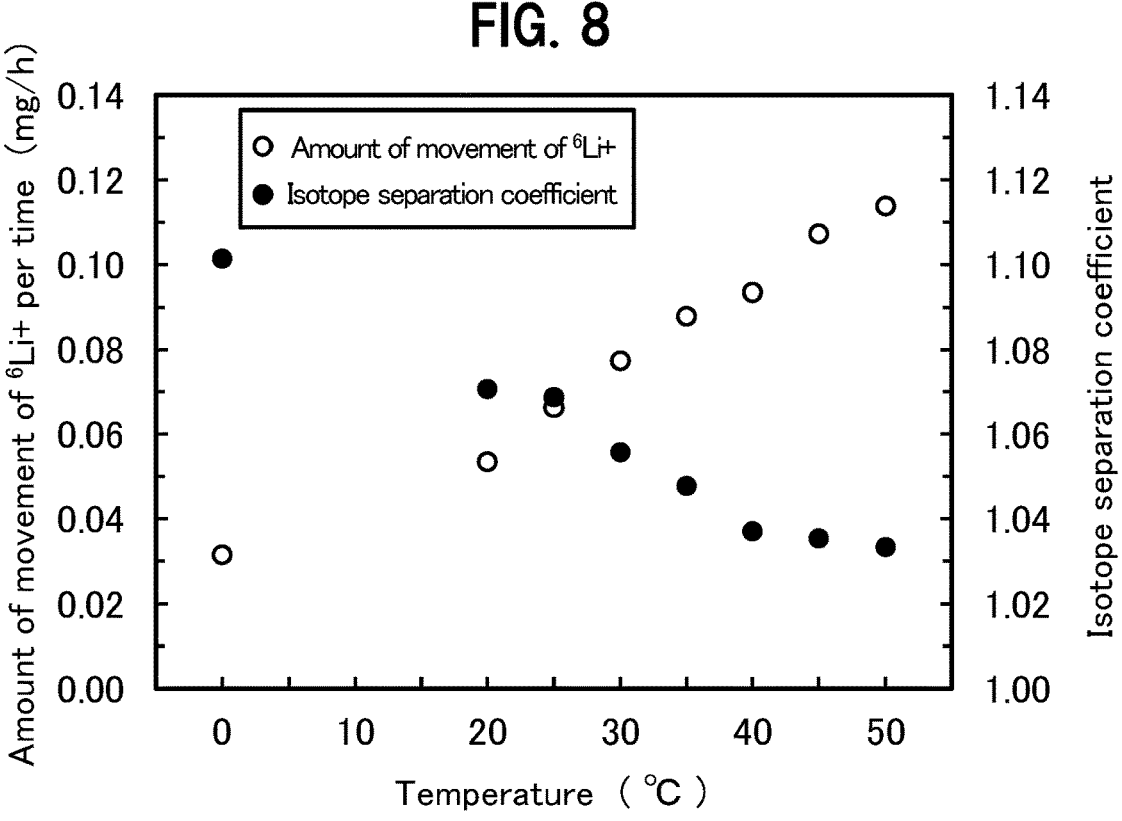
FIG. 8 is a graph showing amounts of movement of lithium and temperature dependencies of isotope separation coefficients of lithium according to Example and Comparative Example.
Figure 9:
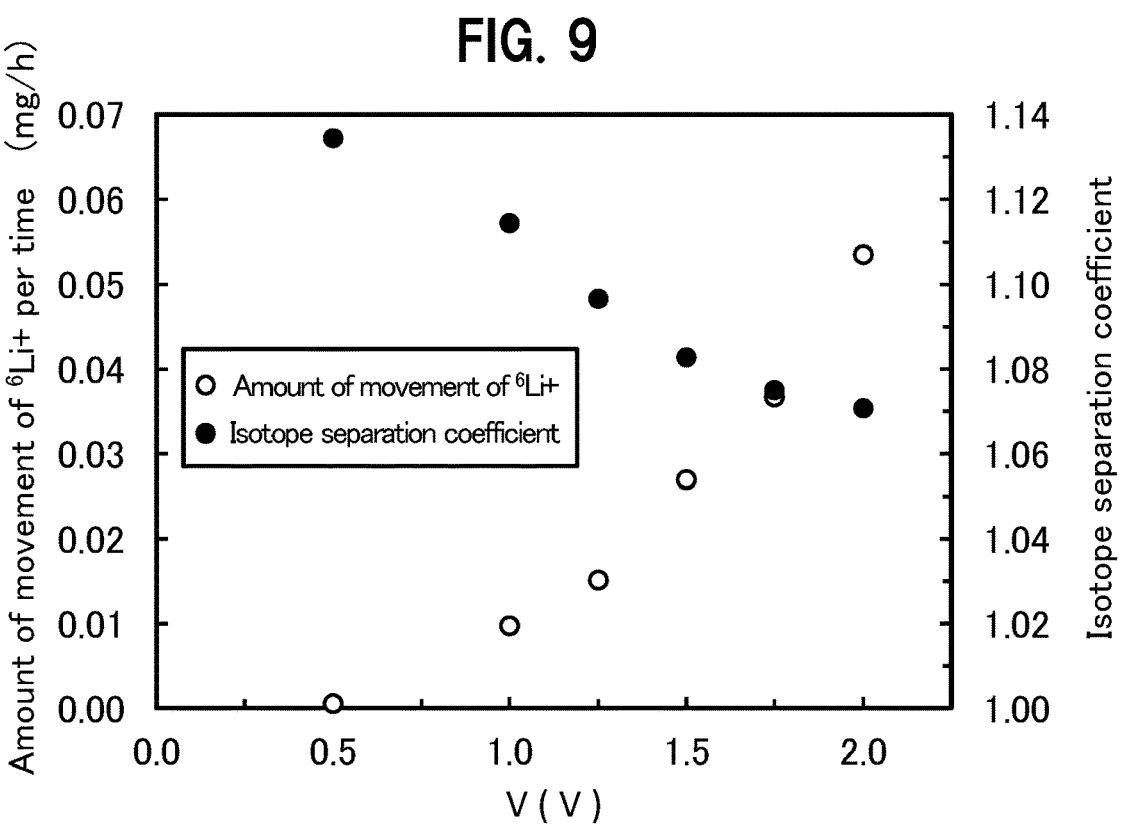
FIG. 9 is a graph showing amounts of movement of lithium and applied voltage dependencies of isotope separation coefficients of lithium according to Example and Comparative Example.

The power supply device was connected to the first electrode and the second electrode, and the solution temperature was adjusted to a predetermined temperature, and after the elapse of 12 hours or more, 2.0 V was applied for 3600 seconds by using the first electrode as a positive electrode. During the application of the voltage, the current value was measured by using a current meter connected to the power supply device in series, and the aqueous solutions in the supply tank and the recovery tank were stirred. After the application of the voltage, the aqueous solution in the recovery tank was recovered, and the amounts of $^7$Li, $^6$Li in the aqueous solution were measured by using an inductively coupled plasma mass spectrometry (ICP-MS) device (ELAN DRC-e, manufactured by PerkinElmer, Inc.). The supply tank and the recovery tank were replaced with new ones, and the solution temperature was changed, and 2.0 V was applied for 3600 seconds in the same manner. The solution temperature was adjusted from 20 to 50° C. by every 5° C., and also to 0° C. Moreover, the voltage was changed from 1.0 to 2.0 V by every 0.25 V, and to 0.5 V, and was applied for 3600 seconds at a solution temperature of 20° C. After the application of each voltage, the amounts of $^7$Li, $^6$Li in the aqueous solution recovered from the recovery tank were measured, and the $^6$Li isotope separation coefficient was calculated from the amounts of $^7$Li, $^6$Li. The $^6$Li isotope separation coefficient is defined to be (the ($^6$Li/$^7$Li) molar ratio of the aqueous solution in the recovery tank after the application of the voltage)/(the ($^6$Li/$^7$Li) molar ratio of the lithium hydroxide aqueous solution in the supply tank before the application of the voltage). FIG. 8 and FIG. 9 respectively show a graph of the temperature dependency and a graph of the applied voltage dependency, of the amount of movement of $^6$Li$^+$ (white circle: ○) and $^6$Li isotope separation coefficient (black circle: ●) for 3600 seconds of the application time.

As shown in FIG. 8, the lower the temperature was, the higher the $^6$Li isotope separation coefficient was, while the amount of movement of $^6$Li$^+$ decreased, which however even at 0° C., remained to about ½ of that at 25° C. Thus, it can be said that a sufficient amount can be recovered. In addition, as shown in FIG. 9, the lower the applied voltage was, the higher the $^6$Li isotope separation coefficient was. However, the amount of movement of $^6$Li$^+$ decreased and was very small at 0.5 V. Although the $^6$Li isotope separation coefficient was comparable at 20° C. and 1.25 V to that at 0° C. and 2.0 V, the amount of movement of $^6$Li$^+$ was about ½, and the efficiency was low as compared with concentration of $^6$Li isotope by using cooling. From these, it can be said to be possible to improve the efficiency while enhancing the $^6$Li isotope separation coefficient by combining cooling and voltage control.

REFERENCE SIGNS LIST

10 lithium isotope concentration device
20 multi-stage lithium isotope concentration device
1, 1A treatment tank
11 supply tank (first tank)
12 recovery tank (second tank)
2 electrolyte membrane (lithium-ion conductivity electrolyte membrane)
31 first electrode (electrode)
32 second electrode (electrode)
5 power supply device
50 power supply device
6, 6A cooling device
ASi Li-containing aqueous solution
ASo $^6$Li recovery aqueous solution

The invention claimed is:

1. A lithium isotope concentration device which includes a treatment tank partitioned into a first tank and a second tank and which recovers, from an aqueous solution being held in the first tank and containing $^6Li$ and $^7Li$ in a state of lithium ions, a lithium ion-containing aqueous solution having a higher isotope ratio of $^6Li$ than that of the aqueous solution into the second tank, the lithium isotope concentration device comprising:

a lithium-ion conductivity electrolyte membrane partitioning the treatment tank;

electrodes having porous structures, the electrodes being provided in contact respectively with opposite surfaces of the lithium-ion conductivity electrolyte membrane;

a power supply device configured to apply a voltage between the electrodes; and a cooling device configured to cool the lithium-ion conductivity electrolyte membrane at a temperature of 20° C. or lower, wherein the lithium-ion conductivity electrolyte membrane is made of a material comprising lithium lanthanum titanium oxide ($La_{2/3-x}Li_{3x}TiO_3$), wherein the power supply device is configured to apply a voltage, and wherein the voltage applied is between 0.5 V and 1.5 V.

2. The lithium isotope concentration device according to claim 1, wherein the voltage applied by the power supply device is applied intermittently.

3. The lithium isotope concentration device according to claim 1, wherein the power supply device is configured to alternately apply positive and negative voltages.

4. The lithium isotope concentration device according to claim 1, wherein the cooling device is configured to cool the aqueous solution held in at least one of the first tank and the second tank.

5. A multi-stage lithium isotope concentration device comprising:

two or more of the lithium isotope concentration devices according to claim 1, which are coupled such that treatment tanks are integrated, wherein the lithium-ion conductivity electrolyte membranes of the respective lithium isotope concentration devices are arranged away from each other in such a manner as to partition the integrated treatment tanks into three tanks or more, the second tank of one of neighboring two of the lithium isotope concentration devices serves as the first tank of the other, and the cooling device cools the aqueous solution held in at least one tank of the partitioned treatment tanks.

6. A lithium isotope concentration method for in a treatment tank partitioned into a first tank and a second tank by a lithium-ion conductivity electrolyte membrane, recovering, from an aqueous solution being held in the first tank and containing $^6Li$ and $^7Li$ in a state of lithium ions, a lithium ion-containing aqueous solution having a higher isotope ratio of $^6Li$ than that of the aqueous solution into the second tank, the lithium isotope concentration method comprising:

applying a voltage of between 0.5 V and 1.5 V between electrodes having porous structures, the electrodes being provided in contact respectively with opposite surfaces of the lithium-ion conductivity electrolyte membrane, with an electrode on a first tank side being set as positive while cooling the lithium-ion conductivity electrolyte membrane to a temperature of 20° C. or lower, wherein the lithium-ion conductivity electrolyte membrane is made of a material comprising lithium lanthanum titanium oxide ($La_{2/3-x}Li_{3x}TiO_3$).

7. The lithium isotope concentration method according to claim 6, wherein a coagulation point of each of the aqueous solutions held in the first tank and the second tank is lower than 0° C., and the voltage is applied while the lithium-ion conductivity electrolyte membrane is cooled to a temperature of higher than the coagulation point and lower than 0° C.

*  *  *  *  *